United States Patent [19]
Boyle et al.

[11] 3,975,026
[45] Aug. 17, 1976

[54] SEALING CARTRIDGE FOR ROTATING SHAFTS

[75] Inventors: Robert John Boyle; Howard Lewis Rucker, both of Littleton; Alex Anthony Mastro, Aurora; Thomas Peter Jackson, Littleton, all of Colo.

[73] Assignee: Johns-Manville Corporation, Denver, Colo.

[22] Filed: Feb. 14, 1975

[21] Appl. No.: 550,095

[52] U.S. Cl. ........................................ 277/4; 277/9; 277/37; 277/134
[51] Int. Cl.² ........................................ F16J 15/00
[58] Field of Search ................ 277/4, 9.5, 9, 11, 37, 277/58, 134

[56] References Cited
UNITED STATES PATENTS

| | | | |
|---|---|---|---|
| 2,758,857 | 8/1956 | Smith | 277/58 |
| 2,874,983 | 2/1959 | Densmore | 277/4 |
| 3,101,199 | 8/1963 | Hartnagel | 277/9 |

FOREIGN PATENTS OR APPLICATIONS

| | | | |
|---|---|---|---|
| 25,416 | 1/1970 | Japan | 277/9 |

*Primary Examiner*—Samuel B. Rothberg
*Attorney, Agent, or Firm*—Robert M. Krone; Joseph J. Kelly; James W. McClain

[57] ABSTRACT

A sealing cartridge for rotating shafts is described, comprising a housing, an inwardly disposed compressed mechanical packing, and an outwardly disposed radial pressure lip seal. The two types of sealing elements cooperate to permit adequate lubrication of the shaft while yet obtaining complete containment of the functional fluid.

8 Claims, 2 Drawing Figures

SEALING CARTRIDGE FOR ROTATING SHAFTS

BACKGROUND OF THE INVENTION

1. Field of the Invention

The invention herein relates to sealing devices for sealing rotating shafts. More particularly it relates to a cartridge assembly incorporating a plurality of sealing means in a unitary assembly for use with.

2. Description of the Prior Art

The invention herein is a sealing cartridge specifically designed for the sealing of rotating shafts such as the shafts of centrifigal pumps, sheaves, roller shafts, motor shafts and the like. (For brevity, the particular device having the shaft to be sealed will hereinafter be referred to as a pump. It will be recognized, however, that the pump is selected only as a typical example and that the invention is applicable to many other devices having rotating shafts.) In each case the pump contains a fluid on the interior. The function of the sealing device is to permit the rotating shaft to penetrate the wall of the pump casing while yet retaining the fluid on the interior thereof.

Sealing cartridges have been known in the past for use with reciprocating shafts. For instance, U.S. Pat. Nos. 2,443,332; 2,565,923 and 3,224,817 all show cartridge units intended to seal reciprocating piston rods. Each of these devices comprises interior mechanical packings (illustrated as chevron packings) and an exterior wiper ring. The wiper ring is a non-pressure element and serves no sealing function. Rather its purpose is to wipe off that foreign matter which accumulates on the exterior of the unit rod and prevent its being drawn into the interior of the seal on the inward stroke of the rod. In addition it wipes off that fluid passing the mechanical packings and flowing down the piston rods. In the particular device shown in U.S. Pat. No. 2,443,332, the wiper rod also serves to direct the accumulated fluid into a channel for recovery and re-use.

Such devices are not applicable to use with rotating shafts, however. Since reciprocating rods must be lubricated along a significant portion of their length, sealing elements for reciprocating rods are designed to permit a controlled amount of fluid leakage past the sealing element. This is a significantly different concept of sealing than that required for rotating shafts, where complete fluid containment is desired. In the past where compressed mechanical packings were used on rotating shafts, some degree of leakage was required in order to maintain proper lubrication of the seals. This, of course, prevented the attainment of the goal of complete field containment. On the other hand, use of pressure lip seals, while achieving complete fluid containment, presents serious difficulties of replacement when worn and permits sudden massive leakage upon seal failure. Seal designers have been forced to resort to such complex expedients (such as the plurality of staggered seals engaging notched bearings shown in U.S. Pat. No. 3,773,336) in an attempt to simplify seal replacement and to permit greater seal service life.

In addition, such mechanical packings and radial pressure lip seals which have been used in the past have always been individually handled and mounted, requiring a great deal of precise hand cutting and fitting to obtain a satisfactory seal.

OBJECT OF THE INVENTION

It is therefore an object of this invention to define a unitary sealing cartridge, specifically intended for sealing rotating shafts.

It is further an object of this invention to define a unitary sealing cartridge embodying a plurality of sealing means.

It is further an object of this invention to define a unitary sealing cartridge which achieves complete containment of the fluid to be sealed.

SUMMARY OF THE INVENTION

The invention herein is a sealing cartridge for sealing a rotating shaft at the point where the shaft passes through an opening in a casing wall, such as a pump casing. The cartridge comprises
 a. a hollow cylindrical housing of defined dimensions;
 b. attaching means for attaching the cartridge to the casing wall;
 c. a radial pressure lip seal disposed adjacent to the axially outward end of the housing and containing means continuously urging the lip against the shaft;
 d. at least one compressed mechanical packing element disposed adjacent to and axially inwardly of the housing and aligned therewith, with the element maintaining a mechanical sealing relation with the shaft; and
 e. aligning means cooperating with the housing to maintain the compressed mechanical packing element aligned with the housing.

In a preferred embodiment the cartridge also contains sealing means on the exterior thereof to seal the annular space between the exterior of the housing and the interior surface of the opening through the casing walls.

In another embodiment the cartridge also includes retaining means removably affixed to the housing to aid in retaining the radial pressure lip seal in position but yet allowing its ready removal when necessary.

In another embodiment the cartridge also includes a screw or labyrinth type of configuration on the inner cartridge surface, in order to reduce the pressure acting on the radial pressure lip seal.

In specific embodiments the radial pressure lip seal can be a formed lip seal which is urged against the rotating shaft by the resiliency of the material from which it is made, or it may be a spring biased lip seal in which the biasing spring urges the lip against the shaft.

DETAILED DESCRIPTION AND PREFERRED EMBODIMENTS

Figure 1:
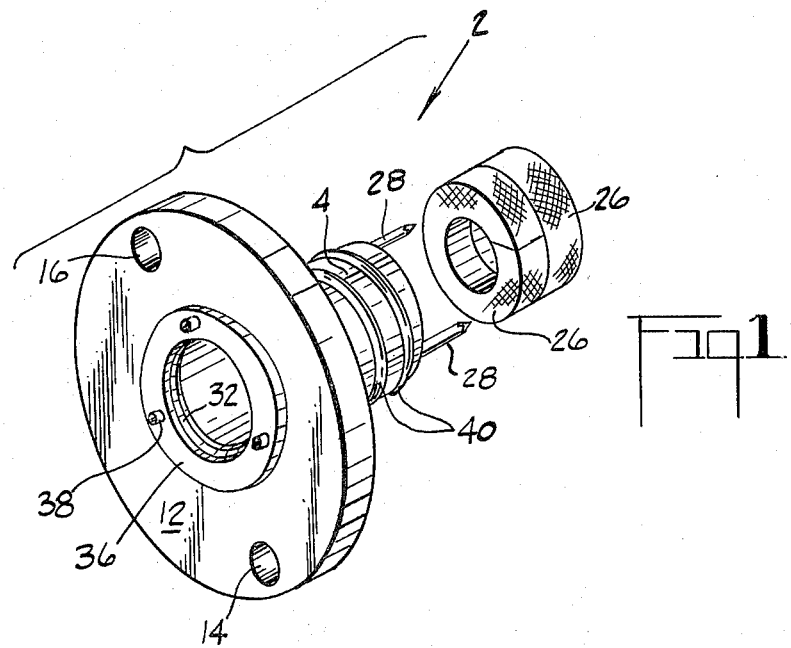
FIG. 1 is an overall perspective and partially exploded view of a cartridge of this invention.

The sealing cartridge of this invention may best be understood by reference to the attached drawings.

The unitary sealing cartridge (generally designated 2) comprises a housing 4 which is an elongated hollow cylinder. The internal diameter of this housing is slightly greater than the external diameter of the shaft 6 which is to be sealed, in order to permit free rotation of the shaft therein. In a preferred embodiment the external diameter of housing 4 is slightly less than the internal diameter of opening 8 through casing wall 10 (of, e.g., a pump) into which the cartridge is to be fitted. In the embodiment shown housing 4 has incorporated therein a radial flange 12 through which are drilled holes 14 and 16. Holes 14 and 16 correspond to holes 18 and 20 in a corresponding flange portion 22 of casing wall 10. Holes 18 and 20 are threaded to accept bolts (such as exemplified at 24) which pass through holes 14 and 16 and by which the cartridge is secured to the casing wall. Alternatively holes 18 and 20 may have smooth bases of greater diameter than bolt 24 and bolt 24 is secured by a conventional nut (or nut and washer) at the inward end of holes 18 and 20.

In an alternative method of securement, the outer surface of the cylindrical portion of housing 4 may have cut therein external threads (not here shown). These threads would mate with corresponding internal threads on the internal surface of opening 8, allowing the cartridge to be screwed into position. In this case, of course, the dimensions of the external diameter of the cartridge and the internal diameter of opening 8 would be such as to conform with conventional bolt thread clearances. This embodiment is not preferred, however, for the rotation of the shaft will have a tendency to dislodge the cartridge if it should rotate in a direction opposite to the direction of the screw threads. Consequently if this threaded embodiment is used it should be supplemented by some form of anti-rotational locking structure such as bolt 24 and the associated holes, a keyway, or the like.

The axial innermost sealing means incorporated in the cartridge of this invention comprises compressed mechanical packing elements 26. Two such elements are shown, but the cartridge may actually include any suitable number desired. Normally this would be from one to four elements. These mechanical packing elements are conventional compressed mechanical packing rings, either die formed or cut from rope. They may be of any material suitable for contact with the fluid to be retained and compatible with the type of service for which the device is intended. Typical mechanical packings are made from such materials as ramie, flax, asbestos, fluorocarbon polymer fibers and cotton, which in turn are impregnated with such materials as petroleum base oils and waxes, animal fats, inert greases, graphite, fluorocarbon polymer liquids and greases and the like. The particular selection of materials to be made is well within the ordinary skill of the art; numerous tables published by packing manufacturers list the various materials and the services for which each is suited.

The compressed mechanical packing elements 26 are disposed axially inwardly of the end of the cartridge housing 4 and are axially aligned therewith. Alignment is provided by spikes 28 which are secured to housing 4 and on which elements 26 are impaled. In the embodiment illustrated in FIG. 2 securement of spikes 28 is by having one end threaded and screwing the spikes into engagement with correspondingly threaded recesses 30 in the axially inward face of housing 4. A force fit could also be used or the spikes could be secured by use of adhesive; the adhesive used would of course have to be stable and inert under the conditions of service.

The particular size of mechanical packings 26 will be chosen according to the diameter of shaft 6. The inner circumference of the mechanical packing elements 26 must maintain a sealing engagement with shaft 6. It will be noted, however, that the mechanical packing elements 26 do not themselves completely restrict the passage of fluid along shaft 6; rather the complete fluid containment is accomplished by the functioning of the radial pressure lip seal to be described below. Pressure of fluid between the inner faces of the elements 26 and the surface of shaft 6 is required for adequate lubrication of the rotating shaft. The mechanical packing elements 26 do, however, significantly reduce the pressure of the fluid passing along shaft 6. They are also critical in the "fail-safe" nature of the operation of the cartridge.

Figure 2:
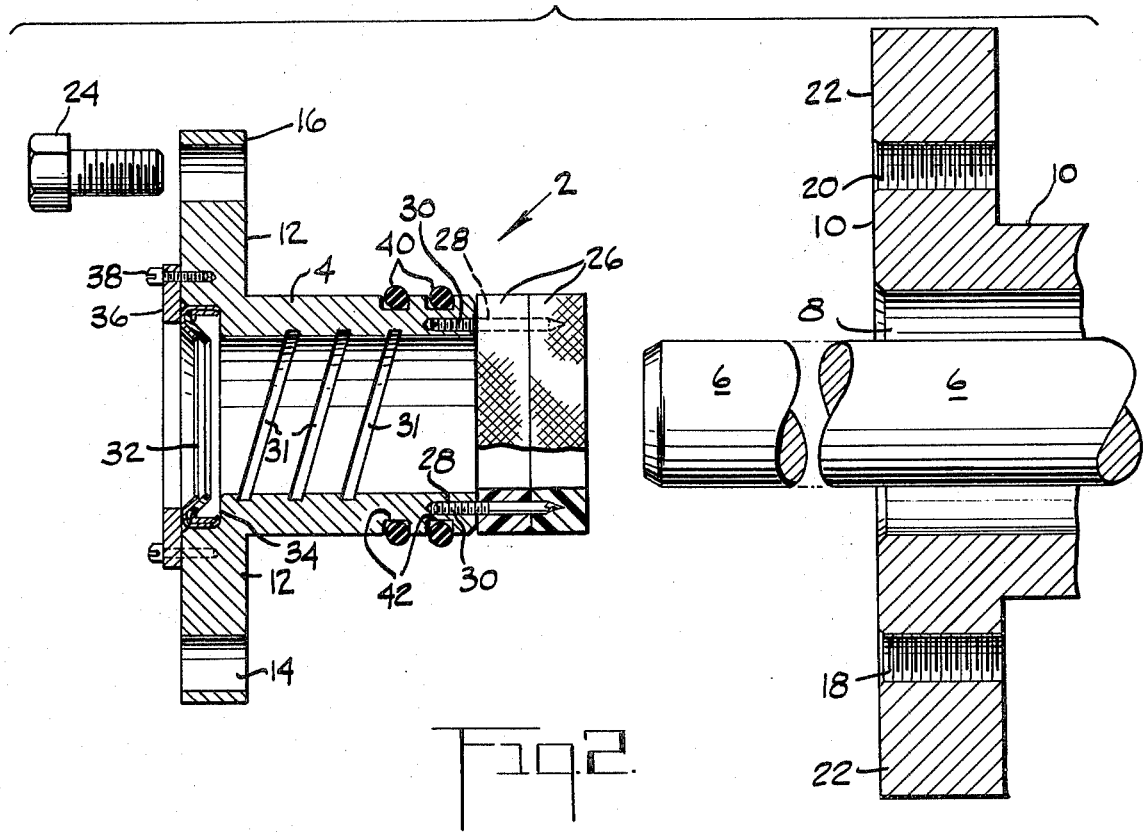
FIG. 2 is a partial cross sectional view of a sealing cartridge of this invention, the shaft which it is to seal, and the casing wall and opening therethrough into which the cartridge is mounted.

FIG. 2 also illustrates a modification of the cartridge in which grooves 31 are cut into the inner surface of housing 4. These may be helical (screw-type), labyrinth, circular (as shown), or other "reverse pumping action inducing" pattern.

The overall axial length of the housing 4 and aligned mechanical sealing elements 26 will be less than the axial length of opening 8.

At the outer axial extremity of the housing 4 is placed radial pressure lip seal 32. This is a molded lip packing element containing an internal lip which is continuously urged against shaft 6. There are a wide variety of radial lip seal designs which will adequately function in the cartridge of the present invention. These include formed lip seals which are continuously urged against the shaft by the resilience of the materials of which they are formed, such as rubber or various synthetic elastomers. Alternatively the seal may be of the spring-biased type in which a circumferential biasing spring is placed on the exterior of the lip and continuously urges the lip into contact with the shaft 6. Depending on the particular material of which the lip is formed, the spring may provide all the biasing force or it may be supplemental to the resilient biasing force inherent in the material itself. Exemplary of the types of radial pressure lip seals which are suitable for use in the device of this invention are those sold by Jones-Manville Corporation under the trademark "CLIPPER" oil seals; among those particularly suitable are those CLIPPER oil seals designated "Type FL", "Sliptite" and "Type LUP" (certain of these seals are described in U.S. Pat. No. 3,275,331).

The radial pressure lip seal 32 is placed in recess 34 formed in the outer face of housing 4 so that the outer face of seal 32 is flush with the outer surface of the housing. The seal size is selected in a conventional manner based on the diameter of shaft 6. Numerous manufacturers' specifications and tables commercially available specify the proper sizes required to maintain continuous sealing contact between the lip of seal 32 and the surface of shaft 6 in order to obtain total fluid containment. The seal 32 is normally retained in recess 34 by a force fit. However, if additional resistance to removal is desired retaining means such as retainer ring 36 which overlaps the outer face of seal 32 and is mounted on the face of housing 4 by small bolts 38.

Also illustrated in FIG. 2 are O-rings 40 seated in circumferential grooves 42 on the exterior of housing 4. In the embodiment shown these serve to seal the annular space which exists between the outer surface of housing 4 and the inner surface of opening 8. Additionally (or alternatively, if desired), mechanical packing elements 26 may be of sufficiently large outside diameter to seal the annular space.

The operation of the unit is apparent from the drawings. During operation mechanical packing elements 26 and radial pressure lip seal 32 cooperate to restrict the passage of all fluid along shaft 6 to the exterior of the pump. This sealing function occurs both when shaft 6 is rotating and when it is at rest. In addition, the cartridge of this invention provides an emergency service feature not possible with conventional single unit packings, in that should either radial pressure lip seal 32 or the mechanical packing elements 26 fail in service, the remaining component will provide sufficient fail safe sealing capacity such that the pump can be retained in service for a limited period until the failed component can be replaced.

The cartridge housing and associated flange, bolts and spikes may be made of any suitable materials. Materials which are quite suitable include metals such as brass and stainless steel although other metals and metal alloys may also be used depending on the particular service and the acceptable cost of fabricating the unit. Additionally under certain conditions of service housings constructed of ceramics or plastics might be desirable. As with the various sealing elements, choice of the housing material is entirely within the skill of those in the art and will reflect the type of service, service life and cost associated with each particular unit.

We claim:
1. A sealing cartridge for sealing a rotating shaft at the point where said shaft passes through an opening in a casing wall, which comprises:
 a. a hollow cylindrical housing, having an axially inward end, an axially outward end, and an exterior surface, within which housing said shaft can rotate freely;
 b. attaching means for attaching said housing to said casing wall;
 c. a radial pressure lip seal disposed adjacent to the axially outward end of said housing and removably retained therein and containing means to continuously urge the lip of said seal against said shaft;
 d. at least one compressed mechanical packing element disposed adjacent to and axially inwardly of said housing and aligned therewith, said element maintaining a mechanical sealing relation with said shaft; and
 e. aligning means cooperating with said housing to maintain said compressed mechanical packing element aligned with said housing.

2. The sealing cartridge of claim 1 wherein said radial pressure lip seal is a formed lip seal.

3. The sealing cartridge of claim 1 wherein said radial pressure lip seal is a spring biased seal.

4. The sealing cartridge of claim 1 further comprising retaining means attached to said housing to aid in retaining said radial pressure lip seal in position.

5. The sealing cartridge of claim 1 wherein said aligning means comprises a plurality of spikes upon which said mechanical packing element is impaled.

6. The sealing cartridge of claim 1 comprising one to four mechanical packing elements all aligned axially with said housing.

7. The sealing cartridge of claim 1 further comprising sealing means adjacent to the exterior surface of said housing to seal the annular space between said exterior surface and the interior surface of said opening.

8. The sealing cartridge of claim 1 further comprising a plurality of reverse pumping action inducing grooves in the inner surface of said hollow cylindrical housing.

* * * * *